(No Model.) 3 Sheets—Sheet 1.
G. RIESECK.
MASH MACHINE AND GRAIN REMOVER.
No. 410,198. Patented Sept. 3, 1889.
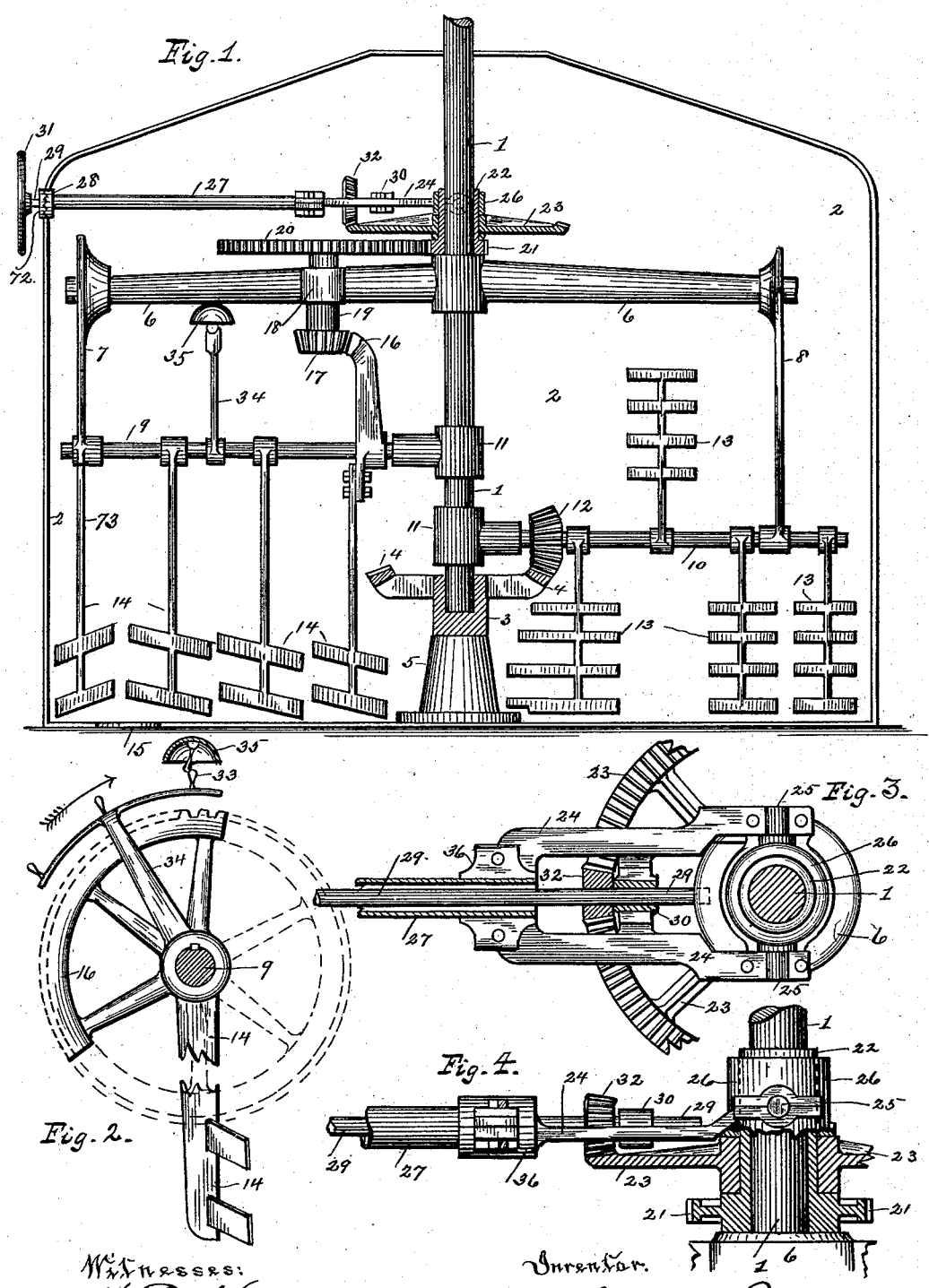

(No Model.) 3 Sheets—Sheet 2.
G. RIESECK.
MASH MACHINE AND GRAIN REMOVER.

No. 410,198. Patented Sept. 3, 1889.

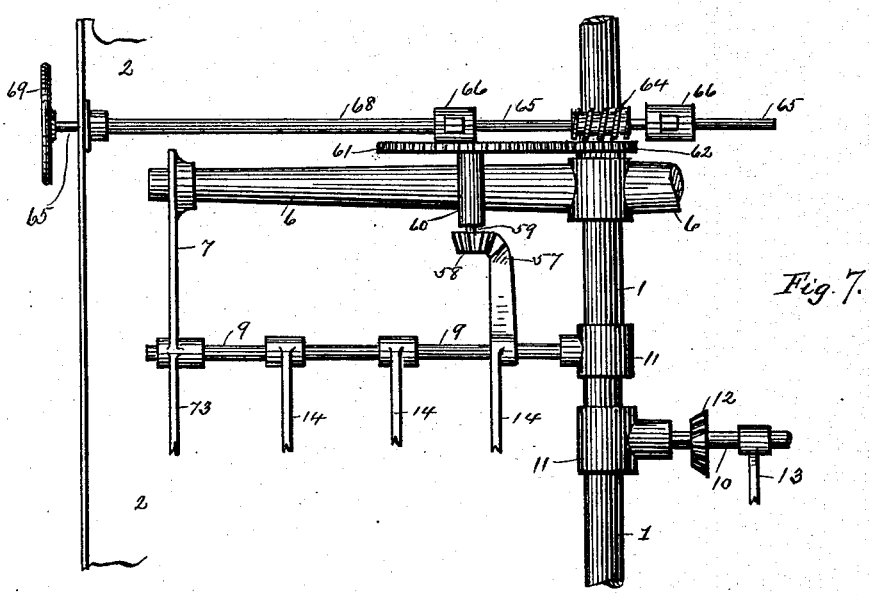

UNITED STATES PATENT OFFICE.

GEORGE RIESECK, OF ALLEGHENY, PENNSYLVANIA.

MASH-MACHINE AND GRAIN-REMOVER.

SPECIFICATION forming part of Letters Patent No. 410,198, dated September 3, 1889.

Application filed January 23, 1889. Serial No. 297,308. (No model.)

*To all whom it may concern:*

Be it known that I, GEORGE RIESECK, a citizen of the United States, residing at Allegheny, in the county of Allegheny and State of Pennsylvania, have invented certain new and useful Improvements in Mash-Machines and Grain-Removers; and I do hereby declare the following to be a full, clear, and exact description of the invention, such as will enable others skilled in the art to which it pertains to make and use the same, reference being had to the accompanying drawings, which form a part of this specification.

My invention relates to an improved mash-machine and grain-remover, the object being to provide a machine whereby the malt placed in a large circular tank or "mash-tub" may be mashed for the purpose of brewing beer, &c.; and, further, to provide an automatic-working machine which will remove the grain from the tub, and also to provide the machine with suitable devices for properly operating the same from the outside of the tub, thereby obviating the necessity of the workman entering the interior of the tub to adjust and operate the apparatus for removing the grain; and with these ends in view my invention consists in the peculiar construction and combination of parts, as will be fully described hereinafter.

Figure 5:
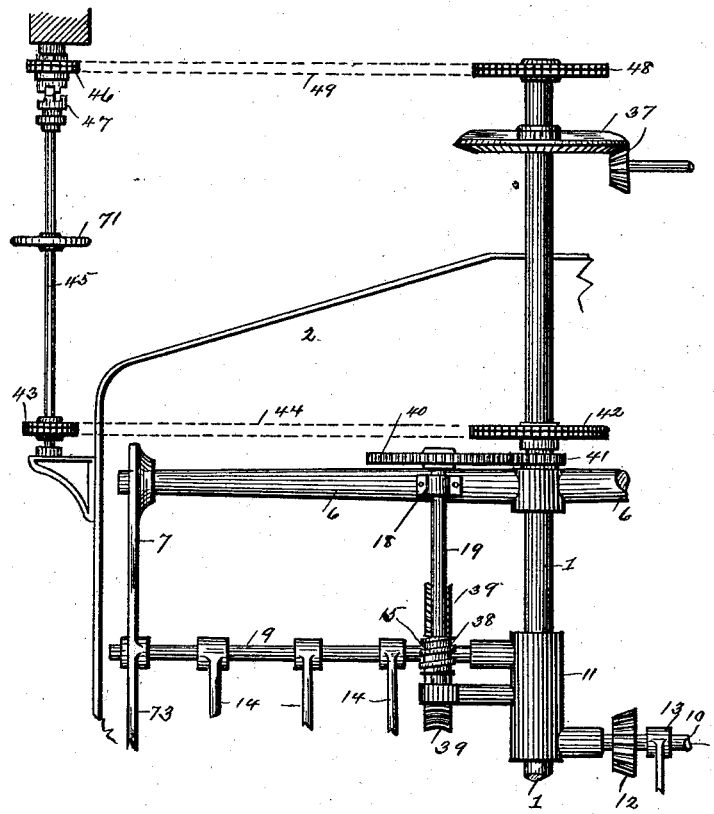
Figure 6:
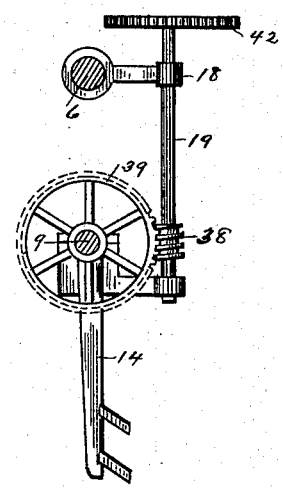

In the accompanying drawings, Figure 1 is a side elevation of my improved mash-machine and grain-remover, partly shown in section the better to show its working parts, the same being constructed in accordance with my invention. Fig. 2 is an end sectional elevation of the grain-removing shaft and the device for operating the same, together with a device for sounding an alarm to indicate the position occupied by the grain-removing paddles. Fig. 3 is a sectional plan view of the vertical driving-shaft, showing attached thereto the mechanism used for operating the grain-removing shaft from the outside of the tub. Fig. 4 is a side central sectional elevation of the same, partly shown in elevation. Fig. 5 is a front elevation of a device for operating the grain-remover, being a modification of that shown in Figs. 1, 2, 3, and 4. Fig. 6 is a side sectional elevation of the grain-removing shaft with a portion of its operating mechanism attached thereto. Fig. 7 is also a modification of the device for removing the grain. Fig. 8 is a plan view of the same.

To put my invention into practice, I provide a stout shaft 1, and secure the same in a vertical position in the center of a large circular tub 2. The base of this shaft 1 is loosely secured in the hub 3 of a large bevel-wheel 4, which in its turn is attached to a standard 5, attached to the bottom of the tub 2.

At a point some distance above the bottom of the tub 2 is rigidly secured to the shaft 1, in a horizontal position, a strong beam 6, which projects on either side of the shaft 1, and provided at one end with a downwardly-extending arm 8, which serves to support the end of the horizontal shafts 10, the other end of which is supported and retained in position by means of suitable bearings 11, firmly attached to the central shaft 1. The horizontal shaft 10 on the right of the central shaft 1 is provided with a bevel-pinion 12, which meshes with the bevel-wheel 4, attached to the stand 5 in a manner that when the central shaft 1 is revolved the horizontal shaft 10 is rotated by the pinion 12, traveling about the stationary wheel 4. To this horizontal shaft 10 are attached at regular intervals a series of mash-paddles 14, which, when rapidly revolved, mash the grain in a manner well known to the art. When the paddles and arms 14 on the shaft 9 (see Fig. 2) are in a vertical position, they also greatly assist in mashing by shoving or pushing the same, and are especially useful when there is but a small quantity of grain in the tub 2.

Secured to the grain-removing shaft 9 and arm 7 are a series of arms with paddles 14, the paddles of which are in an oblique position and arranged in a manner that when the arms and paddles 14 and arm 73 are revolved about the tub 2 sweep the grain from the center and sides of the tub 2 into an opening 15 in the bottom of the same. This grain-removing shaft 9 is supported by a downwardly-extending arm 7, attached to one end of the beam 6, and provided with an arm 73 and oblique paddles 14, and also with a suitable bearing for the shaft 9. These arms, with paddles 14, may be revolved vertically out of the grain by turning the hand-wheel 31 outside of the tub 2, and then automatically fed downward on the top of the same, thereby removing the grain gradually from the top and preventing any heavy pull or strain on the apparatus while the process of removing the grain is going on. To accomplish this movement of the paddles 14 and automatic feed of the same I attach to the shaft 9 a segment of a bevel-wheel or bevel-wheel 16, which meshes with a bevel-pinion 17, secured in a suitable bearing 18 on the beam 6.

Attached to the top of the short shaft 19, carrying the bevel-pinion 17, is a large toothed wheel 20, which meshes with a small pinion 21, loosely secured about the central shaft 1. This last-mentioned pinion 21 is provided with an upward extension of the hub 22, to which is rigidly attached a bevel-wheel 23 and a frame 24, the said frame 24 being pivoted or journaled at 25 to a collar 26, loosely surrounding the top portion of the hub 22 and resting on the hub of the bevel-wheel 23. The object of this arrangement is to permit an adjustment of any inaccuracy in the construction and fitting of the several portions attached to the frame 24. The other end of this frame 24 is supported by a tube 27, attached thereto and to the bearing 28, riveted to the inside wall of the tub 2. Passing through the center of this tube 27 is a small shaft 29, which has a bearing 30 in the frame 24 and at the outer end a bearing 72 outside the tub 2. The outer end of this shaft 29 is provided with a hand-wheel 31. Attached to this same shaft 29 is a small bevel-pinion 32, in a manner that will permit the shaft 29 and pinion 32 to be moved a short distance in the direction of its length, in order to engage or disengage the pinion 32 from the bevel-wheel 23. If desired, the segment of gear-wheel 16, operating the grain-removing shaft 9, may be removed and an entire bevel-wheel substituted, and the paddles 14 given a rotary motion to assist in mashing. If this is desired, additional arms, with paddles 14, are put on the shaft 9 and the arms and paddles of the grain-removing shaft 9 may be held in a vertical position (see Fig. 2) by withdrawing the shaft 29, with the hand-wheel 31, and disengaging the bevel-pinion 32 from the bevel-wheel 23, and thereby stopping the rotation of shaft 9.

In operation the tub 2 is partly filled with malt and water, and the central shaft 1 given a slower rotary movement by means of suitable gearing 37, attached to the top of the same. The cross-beam 6, being rigidly attached to the shaft 1, revolves about its pivotal point, which causes the mash-shaft 10 to rotate. As the bevel-wheel 4 remains stationary, the pinion 12 must revolve while traveling about the same. The arms and paddles 13, striking the grain, mashes the same, for the purpose well known to the art. When the mashing is finished and it is desired to remove the grain, an opening 15 is made in the bottom of the tub 2 by removing a cover therefrom. This opening 15 is located in such a position near the outer edge of the tub 2 that the arm and paddle 73 and the arms and paddles 14 will shove the grain into and through the same, the arms and paddles 14 being first revolved out of or to the top of the mash or grain. The pinion 32 is engaged with the bevel-wheel 23 by moving the shaft 29 inward, which motion, by means of the clutch 28 outside of the tub, holds the same stationary, together with the bevel-wheel 23 and pinion 21. The pinion 21 being held in one position and the apparatus in motion will compel the toothed wheel 20 to revolve about the same, and thereby revolve the small bevel-pinion 17, and consequently rotate the segmental bevel-wheel 16. When this last-mentioned wheel 16 is in motion, an arm 34, provided with suitable knockers 33, comes in contact with a bell or gong 35, and sounds any number of alarms desired, the object being to warn the operator or give notice at what position the arms and paddles 14 occupy, so that, finally, when the arms and paddles 14 are in a vertical position—such as shown at Fig. 2 on the drawings—the bevel-pinion 32 may be disengaged from the wheel 23, and thereby confine the paddles 14 in that position until the grain has been removed.

It is obvious that if a full bevel-wheel—such as shown by dotted lines at Fig. 2 on the drawings—be used the shaft 9 may be continually revolved and the arms and paddles 14 used for mashing the grain in the same manner as the paddles 13 on the other side of the shaft 1. If this arrangement is desired, additional arms and paddles 14 are arranged on the shaft 9 at suitable positions and distances. It will be seen that by the arrangement of the gearing operating the grain-removing shaft 9 the same is given a slow rotary movement. The shaft 9 may be operated by means of the hand-wheel 31 while the apparatus is stationary or revolving, if desired.

At Figs. 5 and 6 on the drawings I have shown a somewhat similar device for operating the arms and paddles 14, which consists in a worm 38, instead of the pinion 17, operating in a worm-wheel 39, which is driven by a toothed wheel 40, meshing with a pinion 41, loosely secured on the central shaft 1. To this pinion 41 is attached a sprocket-wheel 42, and it in turn to a small sprocket-pinion 43, rigidly fixed to a vertical shaft 45, located outside of the mash-tub 2. At the top of this shaft 45 is loosely fixed a small sprocket-wheel 46, which may be rotated with the shaft 1 by means of an ordinary clutch 47. This small sprocket-wheel 46 is operated by means of a large wheel 48, attached to the central shaft 1, and a connecting-chain 49. When desired to operate the grain-removing shaft 9 with this device, the clutch 47 is thrown into gear, which causes the shaft 45 to revolve and the motion transferred to the large sprocket-wheel 42 by the chain 44 and pinion 43, and from thence to the small pinion 41, and in its turn to the toothed wheel 40 and to the worm 38, and from the worm 38 to the worm-wheel 39, which gives the shaft 9 a slow rotary motion. This shaft 9 may also be operated by means of the hand-wheel 71 when the mash-machine is stationary or in motion.

At Figs. 7 and 8 on the drawings I have shown another modification of my invention, which consists in a segmental wheel 57, attached to the grain-removing shaft 9, which is operated by a bevel-pinion 58, attached to a short shaft 59, mounted in a suitable bearing 60, formed on the beam 6. This pinion 58 is in turn operated by a toothed wheel 61, meshing with a pinion 62, loosely journaled on the central driving-shaft 1. Mounted rigidly on the hub of this last-described pinion 62 is a worm-wheel 63, which meshes with a horizontally-moving worm 64, attached to a small shaft 65, capable of moving a limited distance in the direction of its length by sliding in its bearings 66, the said bearings 66 forming a part of a frame 67, which is loosely journaled to the hub of the pinion 62, similar to that described at Figs. 1, 3, and 4 on the drawings. This worm-shaft 65 extends through a tube 68 to the exterior of the tub 2, and is provided with a hand-wheel 69.

The operation for removing the grain with this apparatus is similar to that described under Fig. 1 on the drawings. If it is desired to gradually lower the arms and paddles 14 into the grain for the purpose of removing the same, the worm 64 is placed in gear with the wheel 63 and the same locked fast. This holds the worm-wheel 63 and pinion 62 stationary. The beam 6, revolving, compels the toothed wheel 61 to travel about the pinion 62, therefore operating the bevel-pinion 58 and segmental wheel 57, which slowly revolves the arms and paddles on the shaft 9 downwardly, removing the grains, as before described. A suitable alarm 35, such as before described, is also used in connection with this apparatus for the purpose of indicating the position of the arms and paddles 14. It is obvious that the arms and paddles 14 may be elevated out of the mash by revolving the hand-wheel 31.

Having thus described my invention, what I claim, and desire to secure by Letters Patent, is—

1. In a mash-machine and grain-remover, the combination consisting of the central shaft 1, the beam 6, secured thereto and having suspended thereto in suitable bearings 7 11 the grain-removing shaft 9, the arms with oblique paddles 14, attached to said shaft 9, and the stationary arm 73, having oblique paddles 14 arranged opposite to those on shaft 9, the segmental bevel-wheel 16, attached to the shaft 9, the bevel-pinion 17, meshing with the wheel 16, the toothed wheel 20, operating on the same shaft 19 with the bevel-pinion 17, and meshing with a pinion 21, loosely journaled on the driving-shaft 1, the bevel-wheel 23, secured to the said pinion 21, and the bevel-pinion 32, mounted in a frame 24 and capable of being thrown into or out of gear with the bevel-wheel 23 by means of the sliding shaft 29, and a clutch 72 for the purpose of locking the bevel-pinion 32, to prevent the same from revolving, substantially as and for the purpose set forth.

2. In a mash-machine, the combination of a vertical rotary shaft carrying a horizontal beam, an axially-turning shaft 9, suspended from said beam and carrying a series of paddles, a short vertical counter-shaft journaled on said horizontal beam and geared to the shaft 9, mechanism, substantially as described, for rotating the counter-shaft and the shaft 9, the knockers carried by the shaft 9 to rotate therewith, and a bell on the horizontal beam in the path of said knockers, all arranged and combined for service substantially as described.

3. In a mash-machine, the combination, with a vertical power-shaft and a mash-tub, of a pinion fitted loosely on said shaft, a horizontal frame 24, pivoted on an extended hub of said pinion and having a tubular arm which is fixed at its outer end to the mash-tub, a horizontal shaft supported in said tubular arm and having a pinion which meshes with the loose pinion, a horizontal beam, a horizontal shaft 9, supported by said beam, and gearing intermediate of said horizontal shaft and the loose pinion, substantially as described.

4. The combination of a vertical rotary shaft carrying a horizontal beam, a horizontal axially-turning shaft 9, suspended from said beam by stationary bearings and having the arms and paddles, a vertical counter-shaft journaled on the horizontal beam and geared to the horizontal shaft 9, a toothed wheel 21, fitted loosely on the vertical rotary shaft and gearing with the counter-shaft, and an endwise-movable shaft having a pinion adapted to gear with said wheel 21 to rotate the latter, substantially as and for the purpose described.

5. A mash-machine and grain-remover such as described, consisting of the central driving-shaft 1, having a beam 6 attached thereto, the two horizontal shafts 9 10, supported thereby and by the driving-shaft 1, the stationary bevel gear-wheel 4, the pinion 12, attached to the shaft 10, the mash-paddles 13, secured to the said shaft 10, the paddles 14, arranged in an oblique position on the shaft 9, the bevel-wheel 16, meshing with a pinion 17, mounted on the beam 6, the toothed wheel 20, meshing with a pinion 21, loosely journaled to the driving-shaft 1, and said pinion 21 having an upwardly-extending hub 22, to which is secured the bevel-wheel 23 and collar 26, the frame 24, journaled to the said collar 26 and supported at the other end by the tube 27, the shaft 29, extending through the said tube 27, having a bearing 30 in the frame 24, and having a bevel-pinion 32 meshing with the bevel-wheel 23, the clutch 72, for locking the pinion 32, and the wheel 31, secured to one end of the shaft 29 as a means of operating the apparatus automatically and by hand, substantially as described.

6. The combination of a vertical rotary shaft carrying a horizontal beam, a horizontal axially-turning shaft 9, supported by said beam and vertical shaft and carrying the mash arms and paddles, a vertical counter-shaft journaled on the beam and geared at its lower end directly to said shaft 9, and mechanism, substantially as described, for rotating the counter-shaft and horizontal shaft 9 on their axes, substantially as and for the purpose described.

7. The combination of a vertical rotary shaft carrying a horizontal beam, a horizontal axially-turning shaft supported by said beam and vertical shaft and carrying the mash arms and paddles, a vertical counter-shaft journaled on the beam and geared to the horizontal shaft, a stationary frame arranged above the beam adjacent to the vertical shaft, an endwise-movable shaft supported at its inner end in said stationary frame, and gearing intermediate of said endwise-movable shaft and the counter-shaft, substantially as and for the purpose described, 8. The combination of a vertical rotary shaft carrying a horizontal beam, a horizontal shaft 9, supported by said beam and vertical shaft and having the arms and paddles, a vertical counter-shaft geared to the shaft 9 and journaled on the horizontal beam, a toothed wheel fitted on said vertical shaft and geared to the counter-shaft, a stationary frame arranged adjacent to the vertical shaft and said toothed wheel, and an endwise-movable shaft fitted in said frame to gear with the toothed wheel and adapted to be locked against rotation by a suitable locking device, substantially as and for the purpose described.

9. The combination, with a vertical power-shaft, a horizontal beam carried by said shaft, and a horizontal axially-turning shaft 9, supported by said beam and vertical shaft and having the paddles, of a vertical counter-shaft journaled on said beam and geared with the shaft 9, a pinion loosely fitted on the vertical rotary shaft and geared to the counter-shaft, and mechanism, substantially as described, for rotating said pinion independently of the vertical driving-shaft or from the latter, substantially as and for the purpose described.

10. The combination, with a vertical power-shaft, a horizontal beam carried by said shaft, and a horizontal axially-turning shaft 9, supported by said beam and vertical shaft and having the paddles, of a vertical counter-shaft journaled on said beam and geared to the horizontal shaft 9, a pinion fitted loosely on the vertical power-shaft and geared to the counter-shaft, and a shaft geared to said pinion for rotating the latter, substantially as and for the purpose described.

11. The combination, with a vertical power-shaft, a horizontal beam carried by said shaft, and a horizontal axially-turning shaft 9, supported by said beam and vertical shaft and having the paddles, of a vertical counter-shaft journaled on said beam and geared to the horizontal shaft 9, a pinion fitted loosely on the vertical power-shaft and geared to the counter-shaft, and a shaft and connections between the latter shaft and the vertical rotary shaft to automatically rotate the same, the pinion, the counter-shaft, and the horizontal shaft 9, all arranged and combined for service substantially as described, for the purpose set forth.

12. The combination, with a vertical power-shaft, a horizontal beam carried by said shaft, and a horizontal axially-turning shaft 9, supported by said beam and vertical shaft and having the paddles, of a vertical counter-shaft journaled on said beam and geared to the horizontal shaft 9, a pinion fitted loosely on the vertical power-shaft and geared to the counter-shaft, and a shaft geared to said pinion and having a clutch mechanism, and gearing intermediate of the vertical power-shaft and the clutch mechanism of the last-named shaft, all arranged and combined for service substantially as described 13. The combination, with a vertical power-shaft, a horizontal beam, and a horizontal shaft 9, supported by said beam and vertical shaft and carrying the mash arms and paddles, of a vertical counter-shaft journaled on the beam and geared to the horizontal shaft 9, a pinion fitted loosely on the vertical power-shaft to gear with the counter-shaft and having a tubular extension or sleeve, another wheel fitted on said extension or sleeve, and a shaft geared to this last-named wheel for rotating the same, and the pinion to drive the counter-shaft, substantially as described.

14. The combination, with a vertical power-shaft, a horizontal beam, and a horizontal shaft 9, supported by said beam and vertical shaft and carrying the mash arms and paddles, of a vertical counter-shaft journaled on the beam, a pinion fitted loosely on the vertical power-shaft, a horizontal stationary frame loosely connected at its inner end to the vertical power-shaft and rigidly connected at its outer end to the mash-tub, and a horizontal shaft supported in said stationary frame and geared to the pinion, substantially as and for the purpose described.

15. The combination of a vertical power-shaft carrying a horizontal beam, a pinion fitted loosely on the shaft and having a tubular extension, a wheel fitted on said tubular extension or sleeve, a horizontal stationary frame fitted loosely around said sleeve of the pinion above the hub of said wheel and rigidly connected at its outer end to the mash-tub by a tube, a shaft journaled in said frame and its tube, a horizontal shaft 9, carrying the mash arms and paddles, and a counter-shaft geared to the pinion and the shaft 9, substantially as and for the purpose described.

16. The combination of a vertical power-shaft carrying a horizontal beam, a horizontal frame loosely connected at its inner end to said power-shaft, an arm or tube rigidly connected to the opposite end of said frame and the mash-tub to support the horizontal frame in a stationary fixed position, a horizontal shaft journaled in said frame, a pinion fitted loosely on the vertical power-shaft and geared to said horizontal shaft, a shaft 9, carried by the beam and the vertical power-shaft and having the mash arms and paddles, and a vertical counter-shaft intermediate of the loose pinion and the shaft 9, all arranged and combined substantially as and for the purpose described.

In testimony that I claim the foregoing I hereunto affix my signature this 11th day of January, A. D. 1889.

GEORGE RIESECK. [L. S.]

In presence of—
 M. E. HARRISON,
 FRANK W. SMITH.